United States Patent [19]

Hakamata

[11] Patent Number: 5,179,276

[45] Date of Patent: Jan. 12, 1993

[54] OPTICAL SCANNING TYPE IMAGE PICKUP APPARATUS AND OPTICAL SCANNING TYPE MICROSCOPE

[75] Inventor: Kazuo Hakamata, Kanagawa, Japan

[73] Assignee: Fuji Photo Film Co., Ltd., Kanagawa, Japan

[21] Appl. No.: 859,048

[22] Filed: Mar. 27, 1992

[30] Foreign Application Priority Data

Mar. 27, 1991 [JP] Japan .................................. 3-63236
Apr. 8, 1991 [JP] Japan .................................. 3-75202

[51] Int. Cl.⁵ .............................................. H01J 3/14
[52] U.S. Cl. .................................... 250/234; 358/208
[58] Field of Search ............... 250/234, 216; 358/208; 359/372, 373, 385, 388

[56] References Cited

U.S. PATENT DOCUMENTS

| | | | |
|---|---|---|---|
| 4,386,271 | 5/1983 | Chiang et al. ...................... | 250/234 |
| 4,706,772 | 11/1987 | Dawson et al. ..................... | 250/234 |
| 5,065,008 | 11/1991 | Hakamata et al. . | |
| 5,081,349 | 1/1992 | Iwasaki . | |
| 5,081,350 | 1/1992 | Iwasaki et al. . | |
| 5,084,612 | 1/1992 | Iwasaki et al. . | |

Primary Examiner—David C. Nelms
Assistant Examiner—K. Shami
Attorney, Agent, or Firm—Sughrue Mion Zinn Macpeak & Seas

[57] ABSTRACT

An optical scanner and an optical scanning type image pickup apparatus and a scanning microscope, both of which prevents an image from being displaced, and a scanning type microscope for preventing enlargement and reduction in the size of a target image by reciprocally traversing an optical means and a sample (scanning surface) relative to each other. A displacement between the optical means and the sample, which is detected by a displacement detector, is differentiated by a differentiating circuit to issue a differentiation signal Sh. A zero-level of the differentiation signal Sh is detected by a comparator, and the comparator issues a timing signal St upon detection of the zero-level. A horizontal sync signal generator generates a horizontal sync signal Hs upon receipt of the signal St. A pixel clock generator feeds a pixel clock signal Cp to an analog-to-digital converter upon receipt of the signal Hs. The analog-to-digital converter, which generates a digital signal by sampling a series of outputs S from a photodetector, carries out sampling at every main scanning line in response to the pixel clock Cp, which is fed at the above timing.

23 Claims, 13 Drawing Sheets

OPTICAL SCANNING TYPE IMAGE PICKUP APPARATUS AND OPTICAL SCANNING TYPE MICROSCOPE

BACKGROUND OF THE INVENTION

1. Field of the Invention

This invention relates to an optical scanning type image pickup apparatus wherein main and sub scannings of a light beam are effected over a scanning surface by reciprocally traversing both the scanning surface and an optical means for irradiating the light beam over the scanning surface relative to each other, and where a light beam reflected from the region of the scanning surface on exposure to a beam of light is detected by a photodetector.

Further, this invention relates to an optical scanning type microscope and, particularly to, a scanning type microscope wherein an optical means for irradiating a light beam to a sample is supported on a tuning fork, and the tuning fork is rendered to vibrate such that the sample may be scanned with the light beam.

2. Description of the Prior Art

Optical type scanning microscopes have heretofore been used. With the scanning microscope a light beam is converged to a small spot on a sample, and the sample is two-dimensionally scanned with the light spot. The light beam which has passed through the sample during the scanning, the light which has been reflected from the sample during the scanning, or a fluorescence which is produced by the sample during the scanning, is detected by a photodetector. An enlarged image of the sample is thereby obtained in the form of an electrical signal. An example of the scanning microscope is disclosed in Japanese Unexamined Patent Publication No. 62(1987)-217218.

In the conventional optical type scanning microscope, a mechanism which two-dimensionally deflects a light beam by a light deflector has primarily been employed as the scanning mechanism.

However, the scanning mechanism described above has the drawback in that an expensive light deflector, such as a galvanometry mirror or an acousto-optic light deflector (AOD), is necessary. Also, the foregoing mechanism, wherein the light beam is deflected by the light deflector, induces momentarily a change of the incident angle of a deflected light beam upon an objective lens of the light projecting optical means, resulting in an aberration. Therefore, the scanning mechanism has also been deemed as disadvantageous in that the elimination of such an aberration restricts designing of the objective lens. Particularly, in the case where the ACD is utilized, astigmatism occurs in the light beam irradiated out of the AOD as well as from the objective lens. In such a case, a special correction lens is required, which renders the optical means more complicated.

In order to overcome the drawbacks in the prior art being set forth in the above, there has been proposed a scanning mechanism in which a sample is scanned with the light spot of the light beam without deflecting the beam of light. For instance, Japanese Unexamined Patent Publication No. 1(1990)-248946 filed by the same inventor of this application and assigned to the same assignor describes that the light projecting optical means is shifted relative to a sample supporting member to effect scanning of the light spot of the light beam.

As one specific exemplification of such a scanning mechanism wherein the optical means is traversed with respect to the sample supporting member, as disclosed in Japanese Unexamined Patent Publication No. 2(1991)-198550 filed by the same inventor of this application, there has been proposed a scanning mechanism comprised of a tuning fork at one end thereof supporting the optical means, and an electromagnet for applying a driving force, the strength of which varies periodically, to the tuning fork to cause resonation of the tuning fork. According to another specific exemplification, as disclosed also in the Japanese Unexamined Patent Publication No. 2(1991)-198550, a scanning mechanism is proposed wherein a piezoelectric element is mounted on the above-mentioned tuning fork, and the resonance of the tuning fork is carried out by providing a periodic stress to the element under the control of a voltage applied to the piezoelectric element.

This scanning mechanism is advantageous in securing a wider image pick-up area of the microscope because the relative width of tracing of the optical means, or the width of scanning of the light beam (determined by the amplitude of the tuning fork), can be set to a large value when compared with, for instance, scanning mechanisms using piezoelectric elements, ultrasonic vibrators and the like.

However, small amounts of displacements of the image pickup area in a direction of scanning, which is generated by the vibration of the tuning fork, may arise because of the use of a light beam scanning mechanism composed of a combination of a tuning fork and an excitation means for effecting the resonance of the tuning fork. In such cases, the size of an output image will be dependent upon the way a signal output from the foregoing photodetector is processed, or the way a magnifying power may differ even under a constant image size.

In the meantime, in many of the conventional scanning type microscopes, digital image data per each main scanning line is produced by feeding a series of outputs from the photodetector, for detecting a light beam reflected from the sample, and by quantizing and sampling this output signal.

With such a configuration, if the light beam scanning mechanism set forth in the above is employed, an image may be displaced entirely along a direction of main scanning of the light beam when the amplitude of the tuning fork has been changed for zooming when capturing an image with the microscope, for instance. Namely, the phase of a driving voltage to vary the amplitude of the tuning fork and the phase of the tuning fork are not always coincident with each other, and if the driving conditions of the electromagnet for changing the amplitude of the tuning fork, that is, a voltage, a duty ratio, and the like are changed, the phase of the tuning fork will also be varied. Accordingly, in the case where a sampling initiation timing of image data, one every main scanning line, is defined on the basis of the phase of the driving voltage of the electromagnet, as has been practiced in the prior art, the sampling initiation timing is changed in response to the driving conditions, and consequently the captured image will be displaced along the direction of main scanning.

Although the above description has been given of the case where the light beam scanning mechanism is constituted of the tuning fork and the electromagnet in combinations, similar problems can arise when beam of light scanning mechanisms other than the above are employed, if the phase of a signal to drive the scanning mechanism and the phase of a sample to be traversed will be out of phase with each other.

In addition to the drawbacks in the existing scanning type microscope having been set forth in the above, there have been generally known various types of optical scanning type image pickup apparatus wherein main and sub scannings of a light beam are effected across a scanning surface by reciprocally traversing both the scanning surface and an optical means for irradiating the light beam to the scanning surface relative to each other, and where a light beam reflected from the target scanning surface is detected by a photodetector. In the same manner as the scanning type microscope, the optical scanning type image pickup scanning may suffer from drawbacks such as the fluctuation of the image pickup area and the displacement of the captured image along the direction of main scanning.

SUMMARY OF THE INVENTION

Therefore, an object of the present invention is to provide an optical scanning type image pickup apparatus and a scanning type microscope, both of which prevent enlargement or reduction in the size of an image pickup area as described above when employing the scanning mechanism, wherein the optical means is traversed by the vibrating tuning fork.

Another object of the present invention is to provide an optical scanner which constitutes the aforementioned optical scanning type image pickup apparatus and/or the scanning type microscope.

Still another object of the present invention is to provide an optical scanning type image pickup apparatus and a scanning type microscope, both of which prevent an image from being displaced in a direction of main scanning when utilizing a scanning mechanism, wherein a sample supporting member and an optical means are traversed relative to each other.

To this aim, in accordance with one aspect of this invention, there is provided a first optical scanning type image pickup apparatus for preventing enlargement or reduction in the size of the image pickup area, wherein main and sub scanning of a light beam is carried out across a scanning surface by traversing an optical means with respect to the scanning surface by the use of a mechanism for traversing the optical means, the mechanism being constituted of a tuning fork at one end thereof supporting the optical means and an excitation means for applying a driving force, the magnitude of which periodically varies, to the tuning fork to cause the tuning fork to resonate, and where a light reflected from the region of the scanning surface on exposure to a light beam is detected by a photodetector to capture the image of the sample, the first optical scanning type image pickup apparatus comprising:

a means for detecting the amplitude of the tuning fork, and a control circuit which receives an amplitude detection signal, issued from the amplitude detecting means, and produces an output of a control signal responsive to the received signal to the excitation means so that the amplitude of the tuning fork is converged at a desired value.

Further, in accordance with another aspect of this invention, there is provided a first scanning type microscope for preventing enlargement or reduction in the size of an image pickup area wherein main and sub scanning of a light beam is carried out across a sample by traversing an optical means with respect to a sample supporting member by the use of a mechanism for traversing the optical means, the mechanism being constituted of a tuning fork at one end thereof supporting the optical means and an excitation means for applying a driving force, the magnitude of which periodically varies, to the tuning fork to cause the tuning fork to resonate, and where a light reflected from the region of the sample on exposure to a light beam is detected by a photodetector to capture the image of a sample, the first scanning type microscope comprising:

a means for detecting the amplitude of the tuning fork, and a control circuit which receives an amplitude detection signal, issued from the amplitude detecting means, and produces an output of a control signal responsive to the received signal of the excitation means so that the amplitude of the tuning fork is converged at a desired value.

Moreover, according to still another aspect of this invention, there is provided an optical scanner which constitutes the optical scanning type image pickup apparatus and/or the scanning type microscope as set forth, and wherein main and sub scannings of a light beam are carried out across a scanning surface by reciprocally traversing an optical means for irradiating a light beam across the scanning surface relative to the scanning surface, and a light beam having been reflected from the region of the surface on exposure to the light beam is detected by a photodetector to produce an image of a sample, the optical scanner comprising:

(a) a tuning fork at one end thereof supporting said optical means by means of a scanning mechanism for traversing said optical means, (b) a means for detecting the amplitude of said tuning fork, said means including an excitation means for resonating said tuning fork by applying a force, the strength of which periodically changes, to said tuning fork, and (c) a control circuit for converging the amplitude of the tuning fork at a desired value by feeding a control signal responsive to an amplitude detection signal generated from said means upon receipt of said amplitude detection signal.

As has been appreciated from the above, it is preferable to employ, as the amplitude detecting means, a strain gauge fixedly attached to where a strain of the tuning fork is maximum. A piezoelectric element, for instance, is most preferable for this strain gauge.

According to the research that has been conducted by the inventor of this application, it has turned out that the displacement of the image pickup area set forth in the above is due to fluctuations in the amplitude of the tuning fork. Specifically, a resonance frequency of the tuning fork may sometimes be changed by disturbances such as temperature. Although such variations are fairly small, these fairly small variations in the resonance frequency may be enough to cause large variations in the amplitude of the tuning fork because of the sharpness of the resonance curve of the turning fork.

With the optical scanner, the first optical scanning type image pickup apparatus and the first scanning type microscope, according to this invention, having the above-described structures, respectively, even if the amplitude of the tuning fork is changed by variations in the resonance frequency of the tuning fork due to the disturbance, it is possible to maintain the amplitude of the tuning fork at a constant level, since the driving of the excitation means is controlled in response to the variations so that the amplitude of the tuning fork is converged at a desired value.

Thus, controlling the amplitude of the tuning fork at a constant level enables a width of traverse of the optical means which is driven by means of the tuning fork, i.e. a width of scanning of a light beam, to be kept constant. As a result of this, a constant image pickup area is achieved, thereby eliminating variations in size and magnifying power of output images.

The foregoing means for detecting the amplitude of the tuning fork feeds, by way of the strain gauge, an output voltage accurately, in proportion to the amount of displacement of the tuning fork. Therefore, the amplitude of the tuning fork can be detected with accuracy on the basis of this output voltage.

As a sensor for detecting the displacement of the reciprocal traversing mechanism, there have been known, hitherto, an optical sensor, a magnetic sensor, an electrostatic sensor, and the like. However, these existing sensors have several drawbacks such as: the optical sensor is expensive, and renders apparatus bulky in size as a whole, and requires laborious adjustment, and it is also liable to disturbances such as a temperature; the magnetic sensor is less sensitive, slow in response and liable to disturbances; and the electrostatic sensor is expensive, slow in response, and rendering the apparatus bulky in size as a whole, and it is also liable to similar disturbances.

To the contrary, the amplitude detecting means, with a structure comprised simply of the strain gauge such as a piezoelectric element fixedly attached to the tuning fork, is available at quite low cost at present, resulting in a reduced production cost with double or triple digits less when compared with that of various types of existing sensors. The amplitude detecting means, having such a simple structure, allows much reduction in the size of the sensor portion, and hence does not require a laborious adjustment. Moreover, the system, according to this invention, wherein a piezoelectric element, or the like, is attached to the tuning fork is quick in response and has a good immunity to disturbance.

The strain gauge, such as a piezoelectric element, also produces an output of an extremely high voltage; for instance, a peak-to-peak value of 2 V or more, in the case of an amplitude of 100 micrometers. This, disregarding an amplifier for amplifying the output voltage, leads to the aforementioned amplitude detecting means reduced in size and cost.

In accordance with a further aspect of this invention, there is provided a second optical scanning type image pickup apparatus for preventing an image from being displaced in a direction of main scanning wherein main and sub scanning of a light beam across a scanning surface is carried out by reciprocally traversing, relative to each other, the scanning surface and an optical means for irradiating a beam of light across the scanning surface, and where a light reflected from the region of the scanning surface on exposure to the light beam is detected by a photodetector to capture an image of the sample, the second optical scanning type image pickup apparatus, including a signal processing means for producing a digital image data every main scanning line by sampling a series of outputs from the photodetector in the manner as mentioned above, and the improvement further comprising:

a displacement detector for detecting displacement of either the scanning surface to be reciprocally traversed or the optical means, a differentiating circuit for differentiating a displacement signal generated from the displacement detector, and a timing signal generator means for feeding a timing signal to the signal processing means upon detection of a zero-level of an output from the differentiating circuit, whereby the signal processing means initiates sampling on each main scanning line upon receipt of the timing signal.

In accordance with a still further aspect of this invention, there is provided a third optical scanning type image pickup apparatus for preventing an image from being displaced in a direction of main scanning wherein main and sub scanning of a light beam is carried out across a scanning surface by reciprocally traversing, relative to each other, the scanning surface and an optical means for irradiating a beam of light across the scanning surface, and where a light reflected from the region of the scanning surface, on exposure to the light beam, is detected by a photodetector to capture the image of the sample, the third optical scanning type image pickup apparatus including the signal processing means, the displacement detecting means and the differentiating circuit as mentioned above, and the improvement further comprising:

a means for feeding a timing signal, which defines a sampling initiation timing on each main scanning line, to the signal processing means, a zero-level detecting means for detecting a zero-level of an output from the differentiating circuit, and a phase error canceler means for canceling a phase error by shifting the driving signal, to be fed to the reciprocal traversing mechanism, by just exactly an amount equal to a phase difference between the zero-level detection signal output from the zero-level detecting means and the timing signal.

In accordance with still another aspect of this invention, there is provided a second scanning type microscope for preventing an image from being displaced in a direction of main scanning wherein main and sub scannings of a light beam are carried out across a sample by reciprocally traversing relative to each other a sample supporting member, upon which a sample is disposed, and an optical means for irradiating a light beam to the sample, and where a light reflected from the region of the sample on exposure to the light beam is detected by a photodetector to capture an image of the sample, the second scanning type microscope including a signal processing means for producing digital image data at every main scanning line by sampling a series of outputs from the photodetector in the manner as mentioned above, and the improvement further comprising:

a displacement detector for detecting the displacement of either the scanning surface to be reciprocally traversed or the optical means, a differentiating circuit for differentiating a displacement signal generated from the displacement detector, and a timing signal generator means for feeding a timing signal to the signal processing means upon detection of a zero-level output from the differentiating circuit, whereby the signal processing means initiates sampling at every main scanning line upon receipt of the timing signal.

In accordance with a further aspect of this invention, there is provided a third scanning type microscope for preventing an image from being displaced in a direction of main scanning wherein main and sub scannings of a light beam are carried out across a sample by reciprocally traversing relative to each other a sample supporting member, upon which a sample is disposed, and an optical means for irradiating a light beam to the sample, and where a light reflected from the region of the sample on exposure to the light beam is detected by a photodetector to capture an image of the sample, the second scanning type microscope including the signal processing means the displacement detector, and the differentiating circuit as mentioned above, and the improvement further comprising:

a means for feeding a timing signal, which defines a sampling initiation timing at every main scanning line, to the signal processing means, a zero-level detecting means for detecting a zero-level output from the differentiating circuit, and a phase error canceler means for canceling a phase error by shifting the driving signal to be input to the reciprocal traversing mechanism by just exactly an amount equal to a phase difference between the zero-level detection signal output from the zero-level detecting means and the timing signal.

FIG. 14 of the accompanying drawings shows one example of a relationship between a driving voltage of the electromagnet and a phase of the tuning fork in the light beam scanning mechanism constituted of the aforementioned tuning fork and the electromagnet. In the drawing, reference symbol (a) designates a driving voltage Vd; and (b), a phase x of the tuning fork. The phase difference between them is equal to an amount designated by L1 in the drawing. Here, this phase X principally corresponds to the displacement of either the sample supporting member, to be reciprocally traversed by the tuning fork, or the optical means. Also, in the drawing, the reference symbol (c) designates a signal Sh produced by differentiating an output from the displacement detector for detecting the displacement (phase) x.

As can be seen from the drawing, the differentiated signal Sh always generates a zero-level at a maximum or minimum of the displacement x, namely, a point at which a direction of traverse of either the sample supporting member or the optical means is reversed and the traversing speed falls to zero. Therefore, as with the second optical scanning type image pickup apparatus and the second scanning type microscope, if sampling of image data at every main scanning line is initiated at a point when the zero-level is detected, the image data is inevitably acquired at a return point of the light beam which scans across the sample, or at a point with a given period of lag with respect to the return point.

In the third optical scanning type image pickup apparatus and the third scanning type microscope having the above structure, the sampling initiation timing of image data on every main scanning line is defined by a timing signal (horizontal sync signal) Hs designated by the reference symbol (e) of FIG. 14, and a zero-level detection signal Sz which has a phase lead of L2 with respect to a timing signal Hs. If this phase lead is eliminated by retarding the driving voltage Vd by L2, sampling of image data is initiated at every main scanning line at a zero-level of the differentiated signal Sh. As a result, even in the latter case, the acquisition of image data is initiated either at the return point of the light beam which scans across the sample or at a point with a given period of lag with respect to the return point.

With these configurations, unlike the case where the sampling initiation timing of image data is defined on the basis of the phase of the driving voltage Vd, as has been practiced in the existing apparatus, an image will never be displaced even when the relationship in phase between the driving voltage Vd and the tuning fork is changed.

The above and other advantages, features and additional objects of this invention will be made manifest to those who are versed in the art upon reference to the following detailed description and the accompanying drawings in which preferred embodiments incorporating the principles of this invention are shown by way of illustrative examples.

DETAILED DESCRIPTION OF THE INVENTION

With reference to the accompanying drawings, preferred embodiments of the present invention will be described hereinbelow in further detail.

Figure 1:
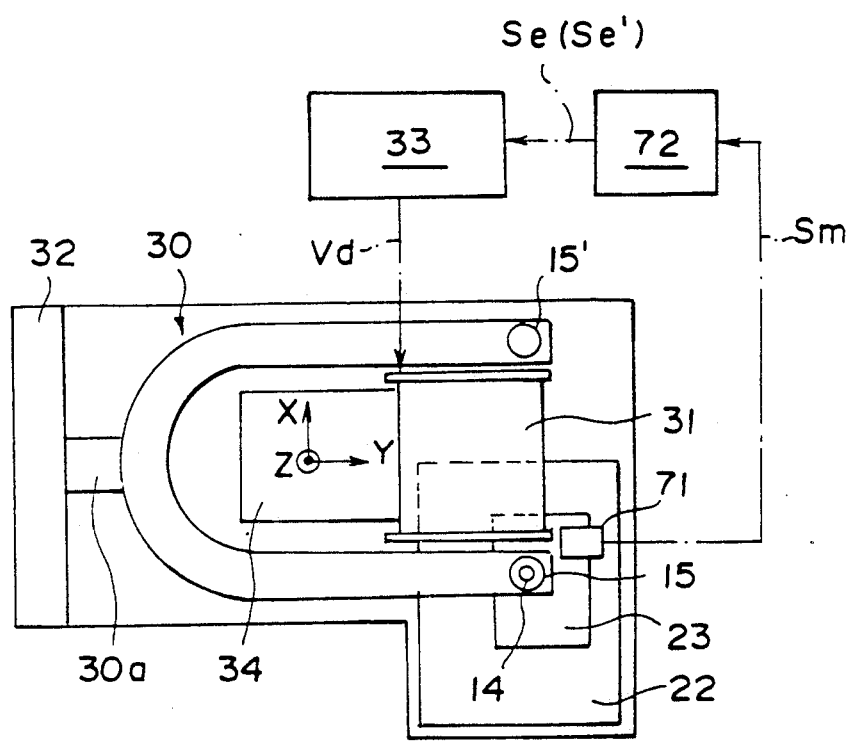
FIG. 1 is a chief plan view showing a scanning type microscope according to a first embodiment of this invention.
Figure 2:
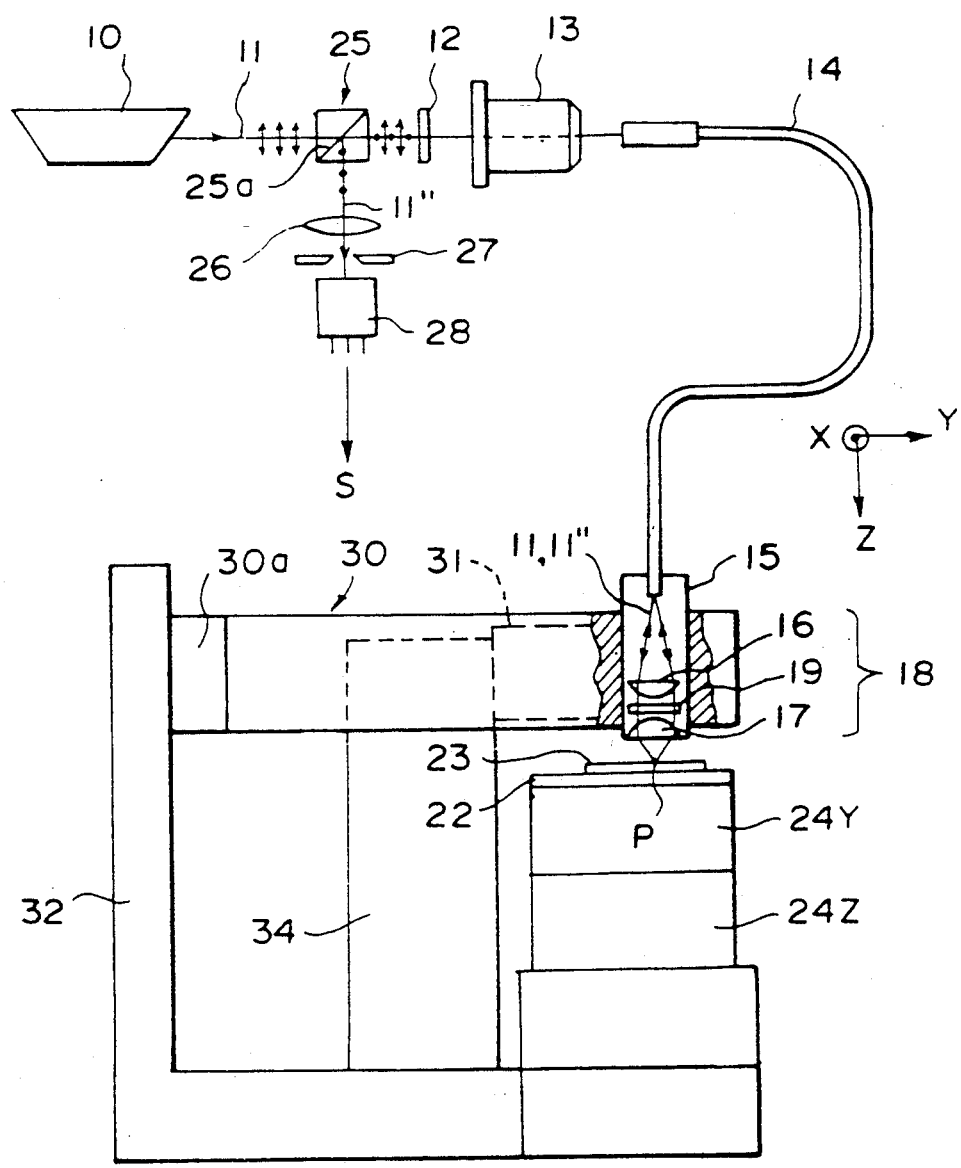
FIG. 2 is a partially broken plan view showing the scanning type microscope of the first embodiment.

FIG. 2 of the accompanying drawings shows a first embodiment of an optical scanning type microscope in accordance with the present invention, which is a monochromatic reflection type of confocal scanning microscope. FIG. 1 is a plan view showing a scanning mechanism employed in this embodiment. As shown in FIG. 2, a monochromatic light laser 10 produces a light beam 11 having a single wavelength. The linear polarized light beam 11 impinges in the P-polarized condition upon a film surface 25a of a polarization beam splitter 25, then passes through a halfwave plate 12 for adjusting the plane of polarization. The light beam 11, which has passed through the halfwave plate 12, is condensed by an entry lens 13 and enters a polarization plane keeping optical fiber 14.

Figure 3:
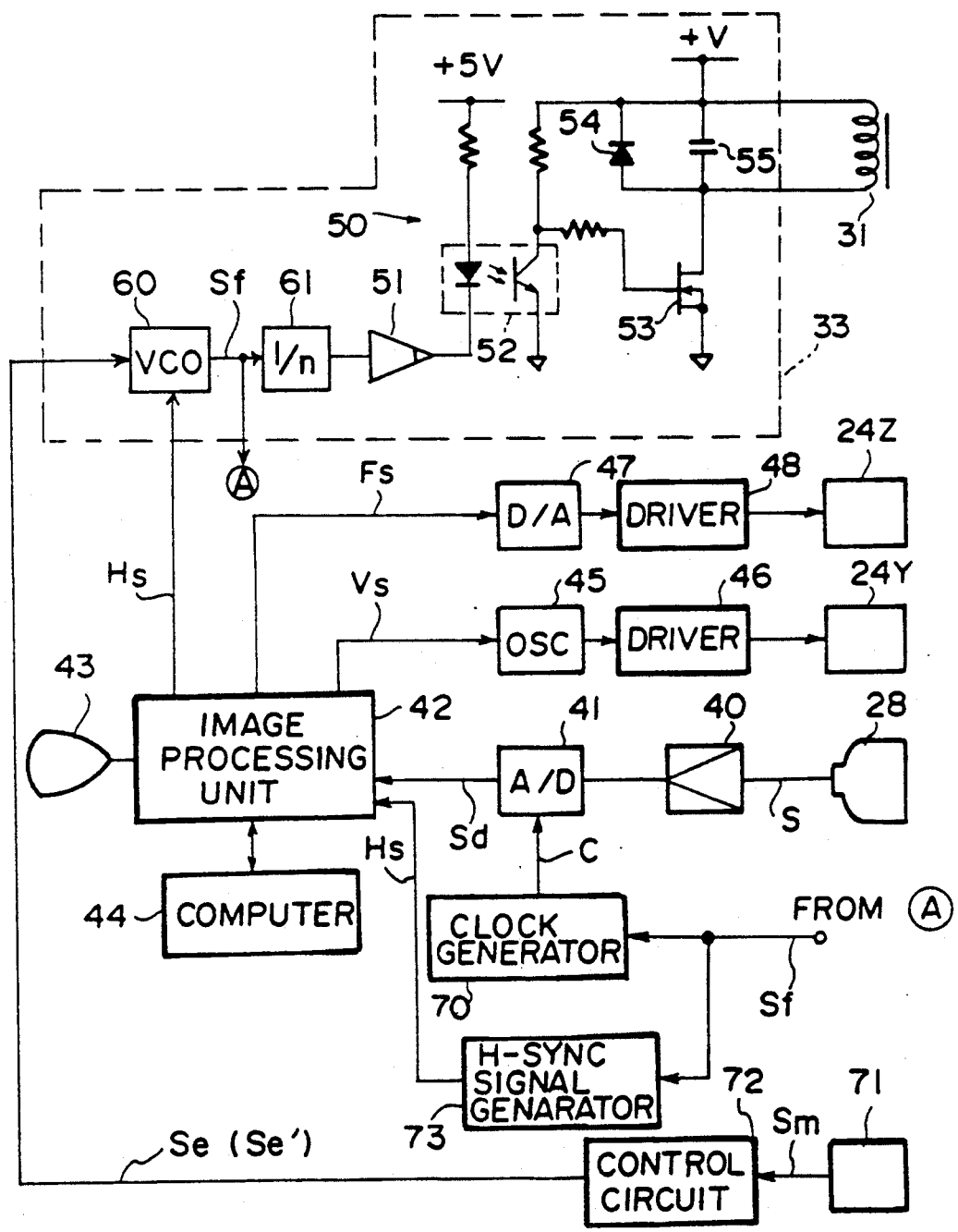
FIG. 3 is a circuit diagram of the scanning type microscope of the first embodiment.
Figure 4:
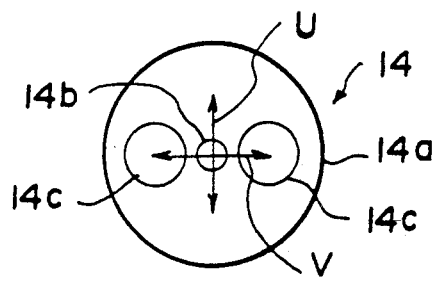
FIG. 4 is a cross-sectional view of a polarization plane keeping optical fiber employed in the scanning type microscope of the first embodiment.

As the polarization plane keeping optical fiber 14, a PANDA type optical fiber may be employed. FIG. 3 shows the cross-sectional configuration of the PANDA type optical fiber. As illustrated in FIG. 4, the optical fiber 14 is composed of a cladding part 14a and a core 14b located in the cladding part 14a. Stress imparting parts 14c and 14c are formed on both sides of the core 14b. The halfwave plate 12 is rotated appropriately such that the orientation of the plane of polarization of the linear polarized light beam 11 coincides with the directions indicated by an arrow V in FIG. 4, along which the stress imparting parts 14c and 14c stand in a line, or the directions indicated by an arrow U in FIG. 4, which directions are normal to the directions indicated by the arrow V. (In this embodiment, the halfwave plate 12 is rotated appropriately such that the orientation of the plane of polarization of the linear polarized light beam 11 coincides with the directions indicated by the arrow U in FIG. 4.) In such a manner, the linear polarized light beam 11 impinges upon the optical fiber 14.

One edge of this optical fiber 14 is secured to a probe 15. The light beam 11, which has passed through the optical fiber 14, is radiated out of the end of the optical fiber 14. At this time, the end of the optical fiber 14 radiates the light beam 11 like a point light source. A light projecting optical means 18 being composed of a collimator lens 16 and an objective lens 17 is secured to the probe 15. (The light projecting optical means 18 also serves as a light receiving optical means.) A quarter-wave plate 19 is located between the collimator lens 18 and the objective lens 17.

The light beam 11 having been radiated out of the aforesaid end of the optical fiber 14 is collimated by the collimator lens 16. The collimated light beam 11 then passes through the quarter-wave plate 19 and is converted thereby into a circularly polarized light beam. The collimated light beam 11 is then condensed by the objective lens 17, and an image of a small light spot of the condensed light beam 11 is formed at a point P on a sample 23 (i.e. on the surface of the sample 23 or in the inside of the sample 23). The sample 23 is placed on a sample supporting member 22. The light beam 11 is reflected by the sample 23. At this time, the direction of rotation of the circularly polarized laser 11 is reversed. The light beam 11", which has thus been reflected by the sample 23, passes through the quarter-wave plate 19 and is converted thereby into a linear polarized light beam 11" having the plane of polarization, which is oriented in the direction normal to the orientation of the plane of polarization of the light beam 11. Thereafter, the light beam 11" is condensed by the collimator lens 16 and impinges upon the polarization plane keeping optical fiber 14. At this time, the orientation of the plane of polarization of the light beam 11" coincides with the directions indicated by the arrow V in FIG. 4. The light beam 11", which has passed through the optical fiber 14, is radiated out of the edge of the optical fiber 14 and collimated by the entry lens 13.

Thereafter, the light beam 11", which has thus been collimated by the entry lens 13, passes through the halfwave plate 12, impinges upon the film surface 25a of the polarization beam splitter 25 in the S-polarized condition, and is reflected by the film surface 25a. The light beam 11", which has thus been reflected by the film surface 25a, is condensed by a condensing lens 26, passes through an aperture pinhole 27, and is detected by a photodetector 28, is constituted of a photomultiplier, and generates a signal S representing the brightness at the region of the sample on exposure to the light beam.

As described above, there is provided the light isolator composed of the quarter-wave plate 19 and the polarization beam splitter 25. Therefore, the light beam 11" does not return to the laser 10, and a large amount of the light beam 11" can be guided to the photodetector 28. Also, the light beam 11 reflected by the entry lens 13, or the end surface of the optical fiber 14, is prevented from impinging upon the photodetector 28. Therefore, a signal S having a high S/N ratio can be obtained.

Now, an explanation will be given of how the sample 23 is two-dimensionally scanned with the light spot of the light beam 11 formed at the point P with reference to FIG. 1. The probe 15 is secured at one end of a turning fork 30, which is made of iron and placed horizontally, such that the optical axis of the optical means 18 extends vertically. A base part 30a of the tuning fork 30 is secured to a frame 32, and the tuning fork 30 can vibrate at a predetermined intrinsic frequency, as will be described later. An electromagnet 31 is located inside the space defined by the tuning fork 30 in a slightly spaced relation to the two-pronged fork of the tuning fork 30. The electromagnet 31 is mounted at a support 34, which is in turn secured to the frame 32.

A driving circuit 33, which constitutes an excitation means, together with the electromagnet 31 applies a rectangular pulse voltage having a frequency equal to the intrinsic frequency of the tuning fork 30 to the electromagnet 31. In this manner, a magnetic field is intermittently applied to the two-pronged fork of the tuning fork 30. Therefore, the tuning fork 30 vibrates at its intrinsic frequency. As a result, the probe 15 secured to the tuning fork 30 is reciprocally moved at high speeds in the directions indicated by an arrow X in FIGS. 1 and 2 (i.e. horizontally). In this manner, the sample 23 is scanned with the light spot P in the direction of main scanning.

A Z-movable stage 24Z capable of reciprocally traversing in the directions indicated by the arrow Z (i.e. along the optical axis of the optical means 18) is located on the frame 32. Also, a Y-movable stage 24Y capable of reciprocally traversing in the directions indicated by the arrow Y (which directions are normal to the directions indicated by the arrows X and Z) is located on the Z-movable stage 24Z. The sample supporting member 22 is mounted on the Y-movable stage 24Y. When the main scanning with the light spot formed at the point P is carried out in the manner described above, the Y-movable stage 24Y is traversed reciprocally. In this manner, the subscanning, with the light spot formed at the point P, can be effected.

Each time the two-dimensional scanning with the light spot formed at the point P is carried out, the Z-movable stage 24Z is traversed appropriately. In this manner, there will be produced a signal S which represents image information at every focusing plate within the range of motion of the sample 23 along the directions indicated by the arrow Z.

In this embodiment, as illustrated in FIG. 1, a dummy probe 15' having the same configuration as the probe 15 is supported at the other end of the tuning fork 30. In this manner, the mechanical balance between both end portions of the tuning fork 30 can be kept properly, and hence an ideal resonant system can substantially be achieved. Also, in the aforesaid embodiment, the electromagnet 31 is located inside the space defined by the tuning fork 30 in order to apply a magnetic field to both end portions of the tuning fork 30. Therefore, the magnetic flux density applied to the tuning fork 30, i.e. the force applied thereto, can be kept larger as compared with when an electromagnet is located outwardly on one end portion of the tuning fork 30.

An electrical configuration for the aforesaid embodiment will be described hereinbelow with reference to FIG. 3. A serial analog signal S, which has been generated by the photodetector 28, is amplified by an amplifier 40. The amplified signal S is then fed into and A/D converter 41. The A/D converter 41 performs sampling of the signal S after having definedfined the cycle and timing of the signal on the basis of a sampling clock issued from a sampling clock generator circuit 70, and then quantifies the thus sampled signal so as to be converted into a digital image signal Sd. The image signal Sd is transferred to an image processing unit 42, which carries out image processing such as gradation processing. Then, the image signal, which has been obtained from the image processing, is delivered to an image reproducing apparatus 43, which may be constituted of a CRT display device, or the like. The image reproducing apparatus 43 reproduces an image, which is represented by the image signal Sd, i.e. a microscope image of the sample 23.

The image reproducing apparatus 43 is connected to a computer 44 such as a personal computer and the like, via the image processing unit 42. Instructions for carrying out image processing, basic operations of the scanning microscope, formation of an image to be used in finding the field of view, and formation of an image to be reproduced finally in the form of a visible image, are entered from an input means such as a keyboard of the computer 44.

The foregoing Y-movable stage 24Y is reciprocally traversed at a predetermined frequency by a driver 46. The driver 46 receives a signal having the predetermined frequency from an oscillator 45. A signal is generated by the image processing unit 42 and is then converted by a D/A converter 47 into a Z axis control analog signal Fs. The Z-movable stage 24Z is operated by a driver 48 in accordance with the Z axis control signal Fs such as to be brought into a predetermined Z position. The oscillator 45 and the D/A converter 47 are respectively controlled by a vertical synchronizing signal Vs and the focusing direction signal Fs, both of which are generated from the image processing unit 42. In this manner, the motions of the stages 24Y and 24Z are synchronized with each other.

The electromagnet driving circuit 33 is constituted of a voltage-controlled-oscillator (VOC) 60 and a 1/n frequency diver 61 followed by a driver 50 provided at a subsequent stage. The driver 50 is composed of an open collector buffer 51, a photocoupler 52, a power MOS-FET 53, a diode 54, and a capacitor 55, and applies to the electromagnet 31 a rectangular pulse voltage Vd having a frequency the same as a pulse signal generated from the 1/n frequency divider 61. The 1/n frequency divider 61 produces an output of 1/n number of pulses as much as the pulse signal Sf generated from the VCO 60. The motion of the stages 24Y and 24Z and the reciprocal transfer of the probe 15 are matched with one another.

Figure 8A:
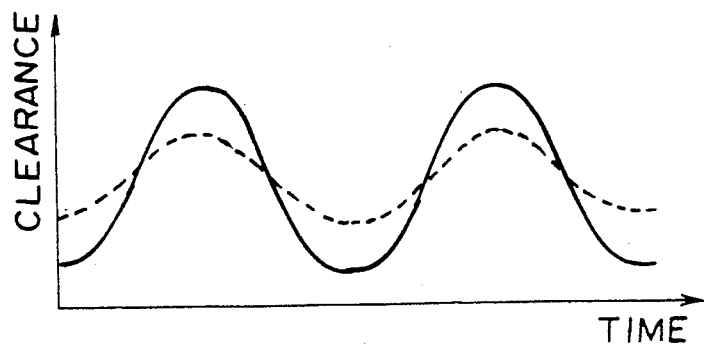
FIGS. 8a, 8b, and 8c are, respectively, graphs showing a relationship among a clearance between an electromagnet and a tuning fork of a scanning type microscope, a leakage flux, and a counterelectromotive force.
Figure 8B:
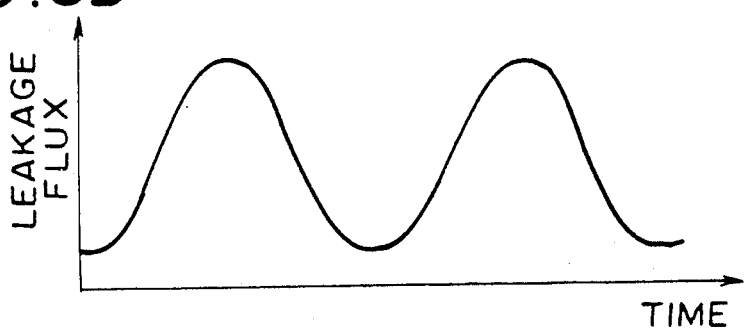

A constant control of the amplitude of the tuning fork 30 will now be described hereunder. As illustrated in FIG. 1, a hole element 71 as an amplitude detector means is placed adjacently at the end of the tuning fork where the probe 15 is supported. This hole element 71 detects the strength of a magnetic flux which leaks sideways from the electromagnet 31. This flux leakage is varied as the clearance between the tuning fork 30 and the electromagnet 31 is changed in accordance with vibrations of the tuning fork 30. Practically, as illustrated in FIGS. 8a and 8b, the wider the clearance, the larger the flux leakage. As a result, an output Sm from the hold element 71 is periodically altered according with vibrations of the tuning fork 30. This output Sm is then delivered to a control circuit 72.

The control circuit 72 calculates a maximum value of the output Sm, as one example. In the case of the tuning fork 30 having a constant amplitude, the clearance between the tuning fork 30 and the electromagnet 31 is varied with a constant characteristic as the tuning fork vibrates. However, if variations arise in the resonance frequency of the tuning fork 30 due to one of the reasons set forth, and the amplitude of the tuning fork falls below a desired value, a minimum value of the clearance will be larger, while a maximum value of the clearance be smaller, as designated by a dotted line in FIG. 8a. If the maximum value falls below a given first reference value R1 (the amplitude of the fork 30 falls below the desired value), the control circuit 72 provides the VCO 60 with an input of a control signal Se sufficient to increase the reference frequency f of the pulse signal Sf by a predetermined minute amount Δf. If a drop in the amplitude is due to shifting of the resonance frequency of the tuning fork 30 towards higher frequencies, the amplitude will be increased. At this time, the control circuit 72 continues to produce an output of the control signal Se to the VCO 60. With such a continuous input from the control circuit, the amplitude of the tuning fork reaches the desired value, and hence the maximum value of the output Sm is increased as far as a second reference value R2, which is relatively larger than the reference value R1. At this precise moment, the control circuit 72 ceases its output of the control signal Se.

On the other hand, if a drop in the amplitude occurs because of shifting of the resonance frequency of the tuning fork 30 towards lower frequencies, inputting the control signal Se to the VCO 60 results in a further drop in the amplitude. In case the amplitude shows such variations, the control circuit 72 continues to feed the VCO 60 an output of a control signal Se', which causes a drop of a minute predetermined amount Δf in the reference frequency f of the pulse signal Sf instead of the control signal Se. Thereby, the amplitude of the tuning fork reaches a desired value, and the maximum value of the output Sm is increased up to the second reference value R2. At this very moment, the control circuit 72 ceases its output of the control signal Se'.

Upon completion of all the processing described above, the frequency of the magnetic field is varied in such a manner as to trace the change of the resonance frequency of the tuning fork 30, thereby constantly maintaining the amplitude of the tuning fork.

In the embodiment, the pulse signal Sf is further delivered to both the sampling clock generator circuit 70 and the horizontal sync signal generator circuit 73, and is utilized at these circuits in defining a generation timing of the sampling clock C and the horizontal sync signal Hs, respectively. The horizontal sync signal Hs is then fed to the image processing unit 42.

Figure 5:
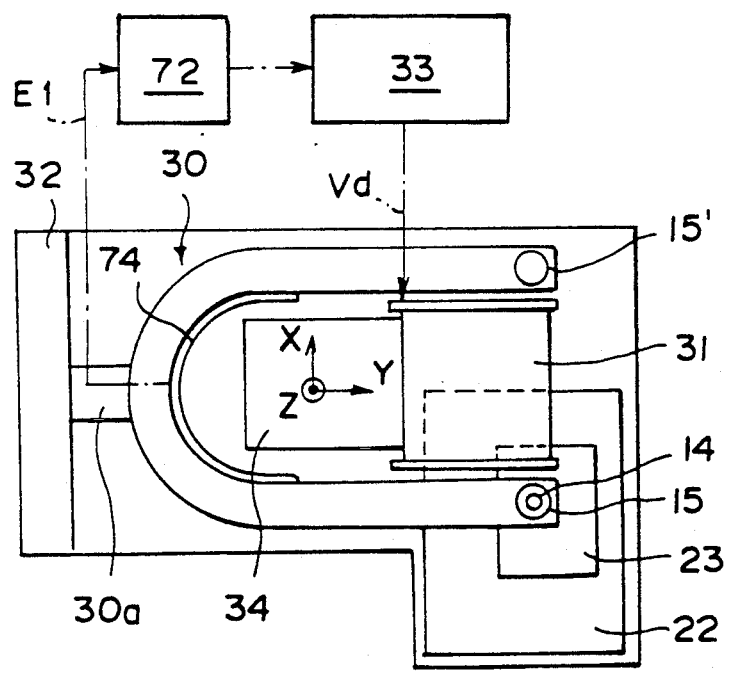
FIG. 5 is a chief plan view showing a scanning type microscope according a second embodiment of this invention.

As a means for detecting the amplitude of the tuning fork 30, in lieu of the hole element 71 employed in the above embodiment, a piezoelectric sheet 74, that is a thin film attached to the tuning fork 30, may alternately be used as illustrated in a second embodiment of FIG. 5. Specifically, since the piezoelectric sheet 74 generates an electromotive force E1 when subjected to a stress due to vibrations of the tuning fork 30, wherein the smaller the amplitude of the tuning fork 30 the smaller the electromotive force, the amplitude of the tuning fork may be detected by the use of this electromotive force. In FIG. 5 and throughout the rest of the specification, the same reference numerals have been provided to the corresponding features that have already been described in the above, and the explanation thereof has been omitted here for clarity.

Figure 6:
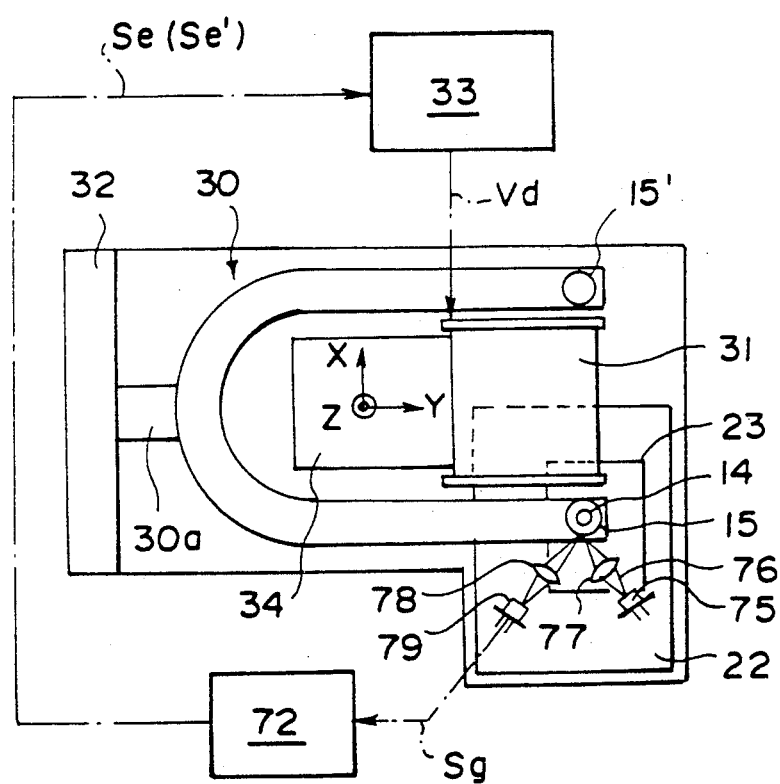
FIG. 6 is a chief plan view showing a scanning type microscope according a third embodiment of this invention.

In a third embodiment illustrated in FIG. 6, an amplitude detecting means is comprised of a semiconductor laser 75, a condensing lens for converging a light beam emanated from the laser, positioned at a side surface of one end portion of the tuning fork, having a specular finish thereupon, a condensing lens 78 for condensing the light beam 76 having been reflected from the side surface, and a photodetector 79 such as a photodiode and the like for detecting the thus condensed light beam 76. The semiconductor laser 75 and the condensing lens 77 are arrayed in such a manner that the light beam 76 is converged at the side surface of the tuning fork when the tuning fork 30 has no vibrations.

With this arrangement, vibrations of the tuning fork 30 cause a periodical shift of the side surface of the tuning fork, to-and-fro with respect to the convergence point. Such shifting of the side surface of the tuning fork in any direction with respect to the convergence point results in a drop in the luminous energy which arrives at the photodetector 79, thereby leading to a fall of the output Sg from the photodetector 79. The amount of drop in the detected luminous energy becomes smaller as the amplitude of the tuning fork 30 falls. Accordingly, if a minimum value of the output Sg is above a given value, the amplitude of the tuning fork turns out to be below the desired value.

Figure 7:
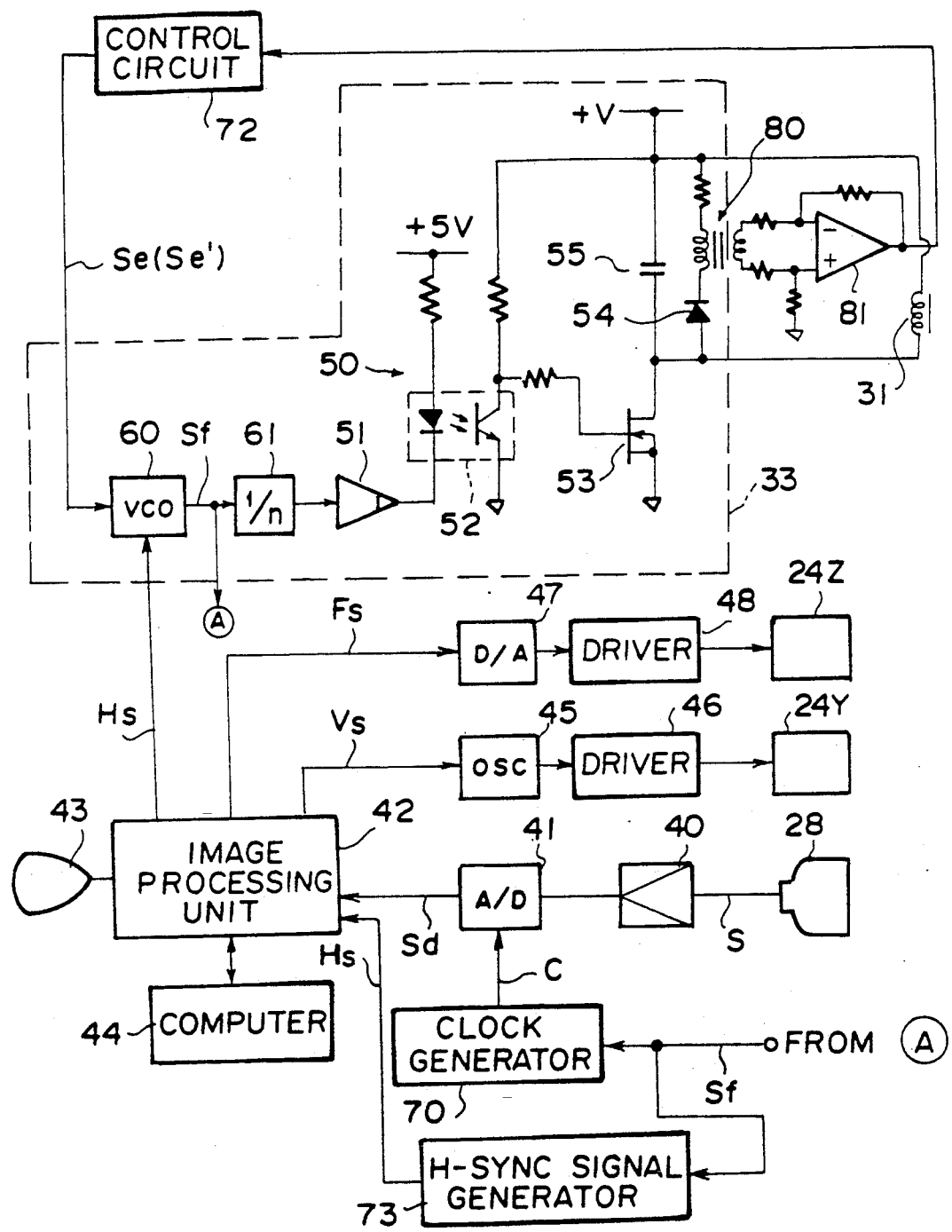
FIG. 7 is a circuit diagram of a scanning type microscope according to a fourth embodiment of this invention.
Figure 8C:
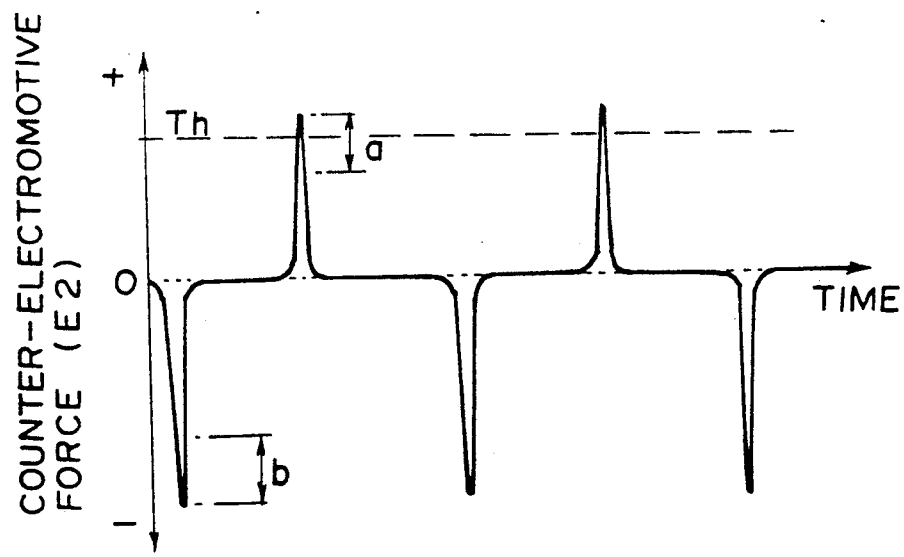

In addition, with the use of the electric configuration illustrated in FIG. 7, the amplitude of the tuning fork 30 can be detected by the detection of a counter-electromotive force E2, which is generated at the electromagnet 31. In this fourth embodiment, the counter-electromotive force E2, which has been generated at the electromagnet 31 because of the vibrations of the tuning fork 30, is detected by a differential amplifier 81 through a transformer 80 arrayed in parallel with the electromagnet 31. This counter-electromotive force E2 is varied in a manner as shown in FIG. 8c when the clearance between the tuning fork 30 and the electromagnet 31 is changed as illustrated in FIG. 8a. Namely, the wider the clearance, the smaller the absolute value of the counter-electromotive force E2.

Consequently, if the amplitude of the tuning fork 30 falls below a given desired value, and if the clearance becomes larger, as a whole, as designated by a dotted line of FIG. 8a, the absolute value of the counter-electromotive force E2 will be reduced by the amount represented by symbols a and b illustrated in FIG. 8c. To prevent this, setting the reference voltage at the positive electrode of the differential amplifier 81 to a value designated by Th of FIG. 8c enables the differential amplifier 81 to produce an output of a given high level signal if the amplitude of the tuning fork 30 is below the given desired value. At this time, as with the first embodiment, the control circuit 72 executes a process to increase the amplitude of the tuning fork 30 up to the given desired value.

Figure 9:
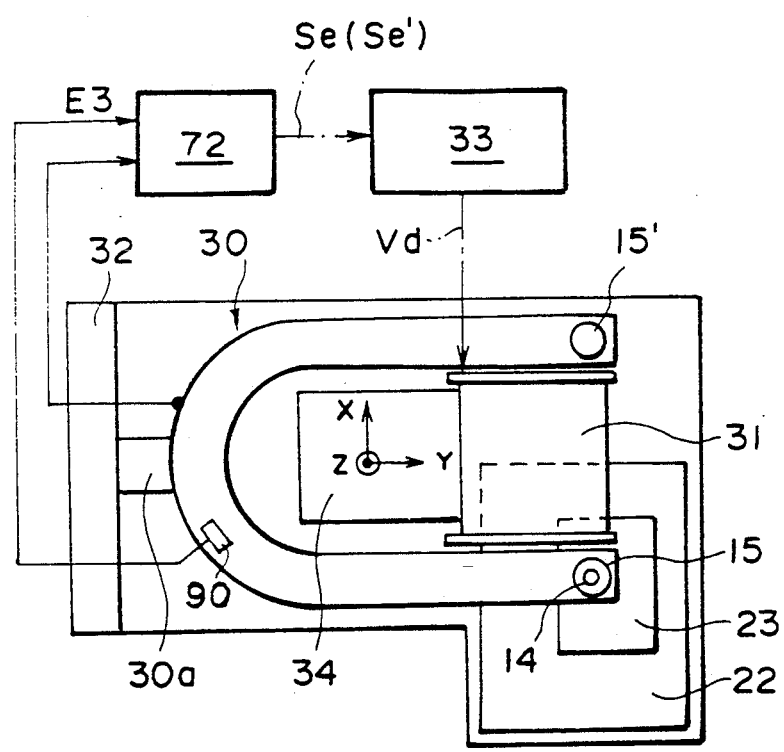
FIG. 9 is a chief plan view showing a scanning type microscope according to a fifth embodiment of this invention.
Figure 10:
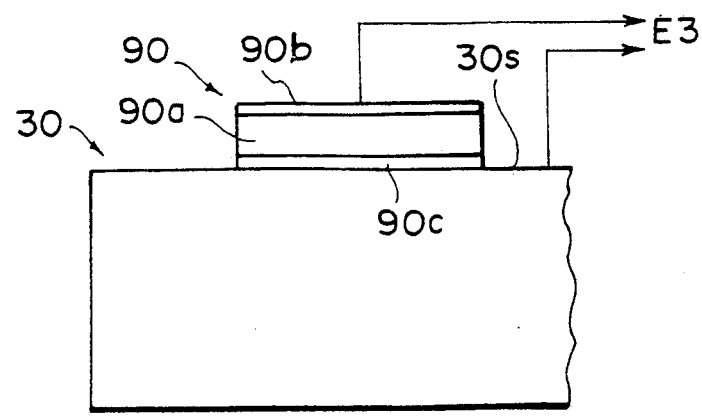
FIG. 10 is a chief side elevation view showing the scanning type microscope of the fifth embodiment.

Upon reference to FIGS. 9 and 10, a scanning type microscope, according to a fifth embodiment of this invention, will now be described. In this fifth embodiment, as illustrated in FIG. 9, a piezoelectric element 90, which servers as a strain gauge, is fixedly attached to the region of the tuning fork 30 where the largest strain will appear, i.e. the situated exteriorly and remotely from its center base portion. As enlarged in FIG. 10, the piezoelectric element 90 consists of electrodes 90b, 90c and a piezoelectric device 90a which is sandwiched therebetween. This piezoelectric element is fixed to the tuning fork 30 by one of the electrodes, i.e. the 90c, adhered to the surface 30s of the tuning fork 30. A glue such as an epoxy resin glue may be suitable for such an adhesion.

Further in this embodiment, the tuning fork 30, where the electrode 90c is attached, acts as one electrode for drawing an output voltage. In such a case, an upper surface 30s of the tuning fork 30 must possess a certain amount of surface roughness in order to establish a proper electrical conductivity across the upper surface 30c and the electrode 90c. Meanwhile, the piezoelectric element 90 should preferably be selected from materials having a high resonance frequency, that is, compact in size, to enhance its responsibility. The piezoelectric element 90 employed in this embodiment, therefore, has dimensions of 5×2×1 mm.

Figure 11:
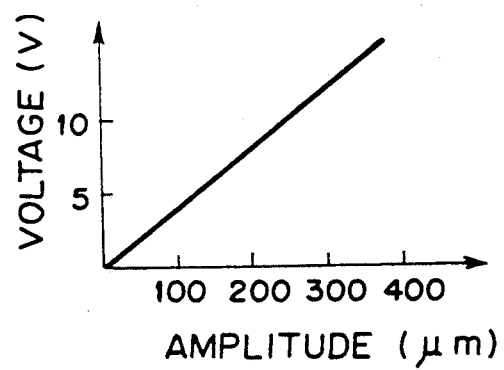
FIG. 11 is a graph showing the amplitude of a tuning fork versus output voltage characteristics of a tuning fork amplitude detector employed in the scanning type microscope of the fifth embodiment.

With such a configuration, a vibration generated over the tuning fork 30 entails the generation of a voltage E3 between the electrode 90b and the main body of the tuning fork 30. As illustrated in FIG. 11, this voltage E3 is precisely proportional to the displacement of the edge of the tuning fork. This consequently allows detection of the amplitude of the tuning fork 30, or the scanning width of the beam of light, with high accuracy. The output voltage E3 that represents the amplitude of the tuning fork is then delivered to the control circuit 72 which is identical with that shown in FIGS. 1 and 3, and is utilized in converging the amplitude of the tuning fork at a desired value.

In view of the vibration, the region which is situated proximately to the center joint portion of the tuning fork 30 and to which the piezoelectric element 90 is attached is hardly subjected to any contacts from other components. The tuning fork amplitude detector is constituted of such a piezoelectric element 90 and hence possesses a good immunity against the aforementioned disturbance. Moreover, the piezoelectric element 90, which is quick in response, leads to a constant, quick response control of the amplitude of the tuning fork.

As has been mentioned in the above, since the piezoelectric element 90 is very inexpensive, the production cost of the tuning fork amplitude detector can be reduced. The simple structure of this tuning fork amplitude detector, as set forth, leads to the apparatus being reduced in size without laborious adjustment. The voltage E3 generated from the piezoelectric element 90 has an extremely high peak-to-peak value, for example, of 2 V or more in the case of an amplitude of 100 micrometers. As a result of this, no amplifiers are usually necessitated for amplifying the output voltage E3, and hence, according to this invention, it is possible to realize a tuning fork amplitude detector which is reduced in size and cost.

In the foregoing embodiment, the amplitude of the tuning fork is increased by changing the frequency of a magnetic field generated by the electromagnet 31 in such a manner as to trace the resonance frequency of the tuning fork. However, the increase in the amplitude of the tuning fork may also be achieved by increasing, for example, a voltage value of the rectangular pulse voltage Vd to be applied to the electromagnet 31 or the duty ratio of the same, instead of the above method.

The above description has been given of the embodiments employed in the scanning type microscope, which causes the tuning fork 30 to vibrate by the use of the electromagnet 31. This invention, however, can be applied to the case where vibration of the tuning fork 30 is generated by other means excitation such as a piezoelectric element attached to the tuning fork 30, for instance, and the same results are surely be obtained; namely, enlargement or reduction in size of the image pickup area are prevented as described above.

The scanning type microscope, as employed in the above embodiments, is of a monochromatic reflection type. However, this invention is never limited to such a specific microscope, but it can be applied to another types of microscopes such as scanning type microscope which produces a color image, a transparent type scanning microscope, or a scanning type fluorescence microscope.

Figure 12:
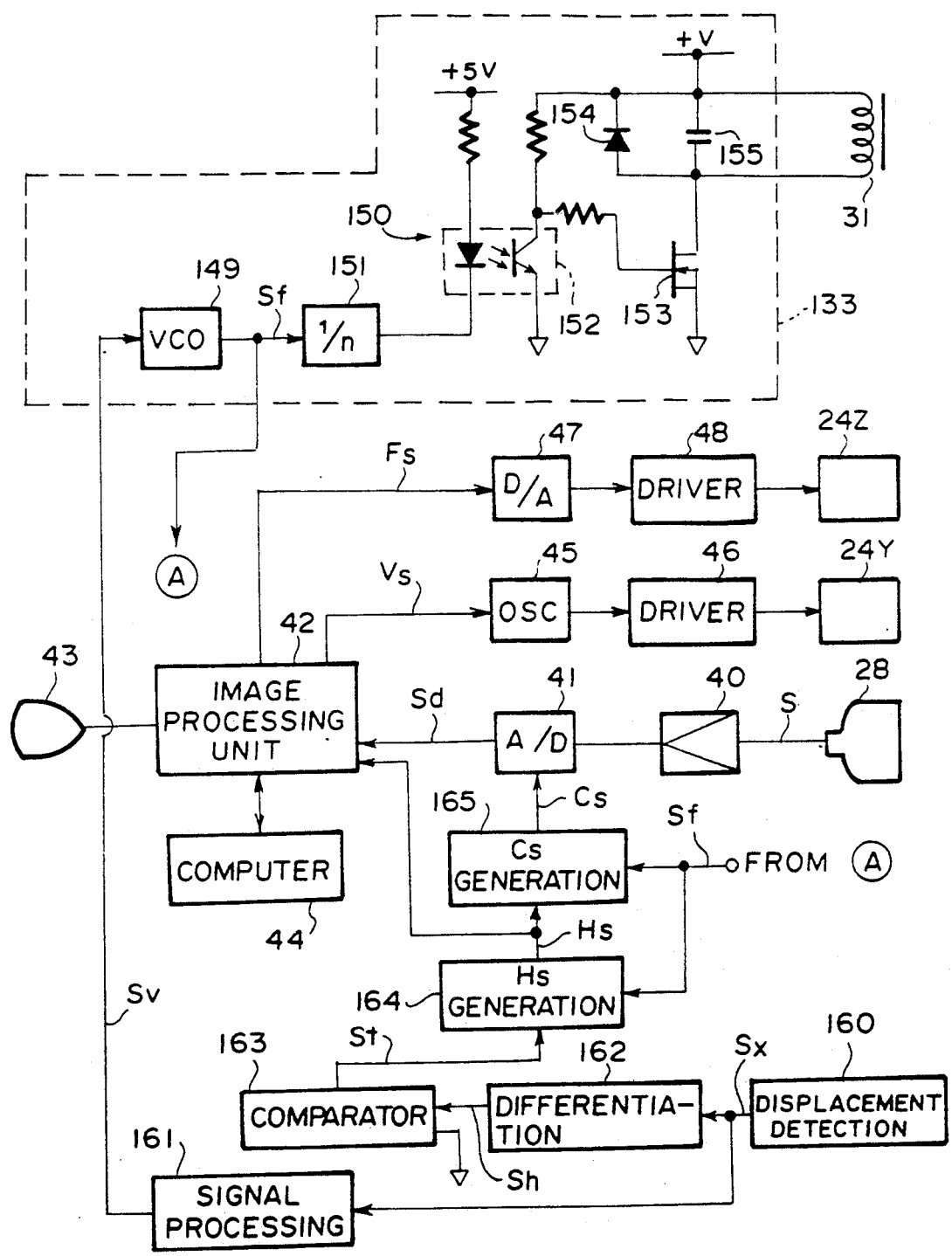
FIG. 12 is a circuit diagram showing a scanning type microscope according to a sixth embodiment of this invention.
Figure 13:
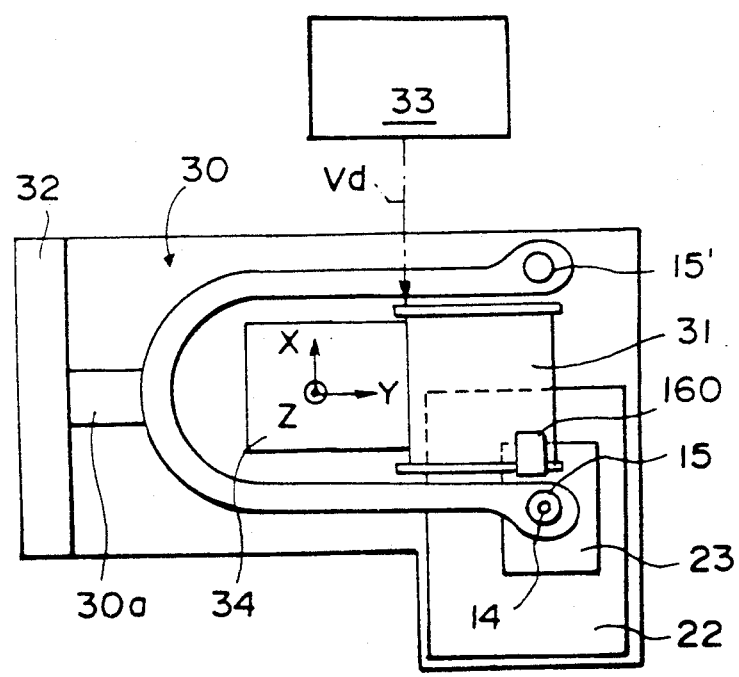
FIG. 13 is a plan view showing a light beam scanning mechanism employed in a scanning microscope according to a sixth embodiment of this invention.

FIG. 13 shows a monochromatic reflection type of confocal scanning microscope, according to a sixth embodiment of this invention. And FIG. 12 shows an electrical configuration of the same. In FIG.13, the same reference numerals are provided to the corresponding features shown in FIGS. 1 and 2, and an explanation thereof will be omitted here for clarity. Moreover, throughout the following embodiments, the principal operations, such as two-dimensional scanning of the light beam and image pickup, are executed in the same manner described in the first embodiment.

Referring to FIG. 12, an explanation will be given of an electrical configuration thereof. First, a driver circuit 133 for electromagnet will be described in details. This driver circuit 133 is constituted of a voltage-controlled-oscillator (VOC) 149 followed by a driver 150 at a subsequent stage. This driver 150 is constituted of a 1/n frequency divider 151, a photocoupler 152, a power MOS-FET 153, a diode 154, a capacitor, and applied to the electromagnet 31 a rectangular pulse voltage Vd having a frequency 1/n times the frequency signal Sf fed from the VCO 149. The electromagnet 31 is provided with a displacement detector 160 for detecting a phase of the edge of the tuning fork 30, i.e. the displacement of the optical means along the X direction, as illustrated in FIG. 13. This displacement detector 160 is constituted of, for example, a piezoelectric element, a hole element, or the like, and produces an output of a signal Sx representative of detected displacements. This displacement signal Sx is then fed to a signal processing circuit 161. Since the displacement signal Sx varies regularly in accordance with vibration of the tuning fork 30, by appropriate processing of this signal Sx by the signal processing circuit 161, there will be obtained the cycle of vibration of the tuning fork 30, i.e. the cycle of scanning of the light beam spot P. The thus obtained a voltage signal Sv, representative of the main scanning cycle, is delivered to the VCO 149. The VCO 149 then changes the frequency of the signal Sf in response to a value of the voltage signal Sv to set the cycle of main scanning to a given value.

A description of a processing system of an image signal will now follow. A series of analog signals S by the photodetector 28 are amplified by the amplifier 40 and then delivered to the A/D converter 41. The A/D converter 41 executes sampling and quantization of this amplified signal, and the signal is then converted into a digital image signal Sd. This image signal Sd is further delivered to the image reproducing unit 43 of the CRT display apparatus after having been subjected to image processing, such as gradation processing in the image processing unit 42. This image reproducing unit 43 reproduces an image represented by the image signal Sd, that is, a microscope image of the sample 23.

Since employed by this image reproducing unit 43 is a common raster scanning type device, the image signal Sd must be produced at every main scanning line an adjustment so that the sampling initiation timing of the analog signal S is matched with the main scanning. For this reason, the displacement signal SX generated by the displacement detector 180 is delivered to a differentiator circuit 162. This differentiator circuit 162 differentiates the displacement signal Sx, and the thus obtained differentiation signal Sn is then transferred to a comparator 163. This comparator 163 detects a zero-level of this differentiation signal Sh, and issues a timing signal St upon detection of the zero-level. This signal St is then fed to a horizontal sync signal generator circuit 164. Upon receipt of the frequency signal Sf, the horizontal sync signal generator circuit 164 issues a horizontal sync signal Hs at every main scanning cycle which is equivalent to the frequency of the signal Sf. The output timing of this horizontal sync signal Hs occurs when the timing signal is fed.

This horizontal signal Hs is fed to the image processing unit 42, as well as a pixel clock generator circuit 165. This pixel clock generator circuit 165 receives the frequency signal Sf, and transfers to the A/D converter 41 a pixel clock Cp having a predetermined frequency which is an integral multiple of the frequency of the signal Sf. The output initiation timing of the pixel clock Cp occurs when the horizontal sync signal Hs is fed. The A/D converter 141 digitizes the analog signal S after having sampled at a frequency of this pixel clock Cp. However, because of the aforementioned input initiation timing of the pixel clock Cp, sampling is inevitably effected at the zero-level of the differentiation signal Sh or at a timing with a constant period of lag relative to the zero-level time.

Figure 14:
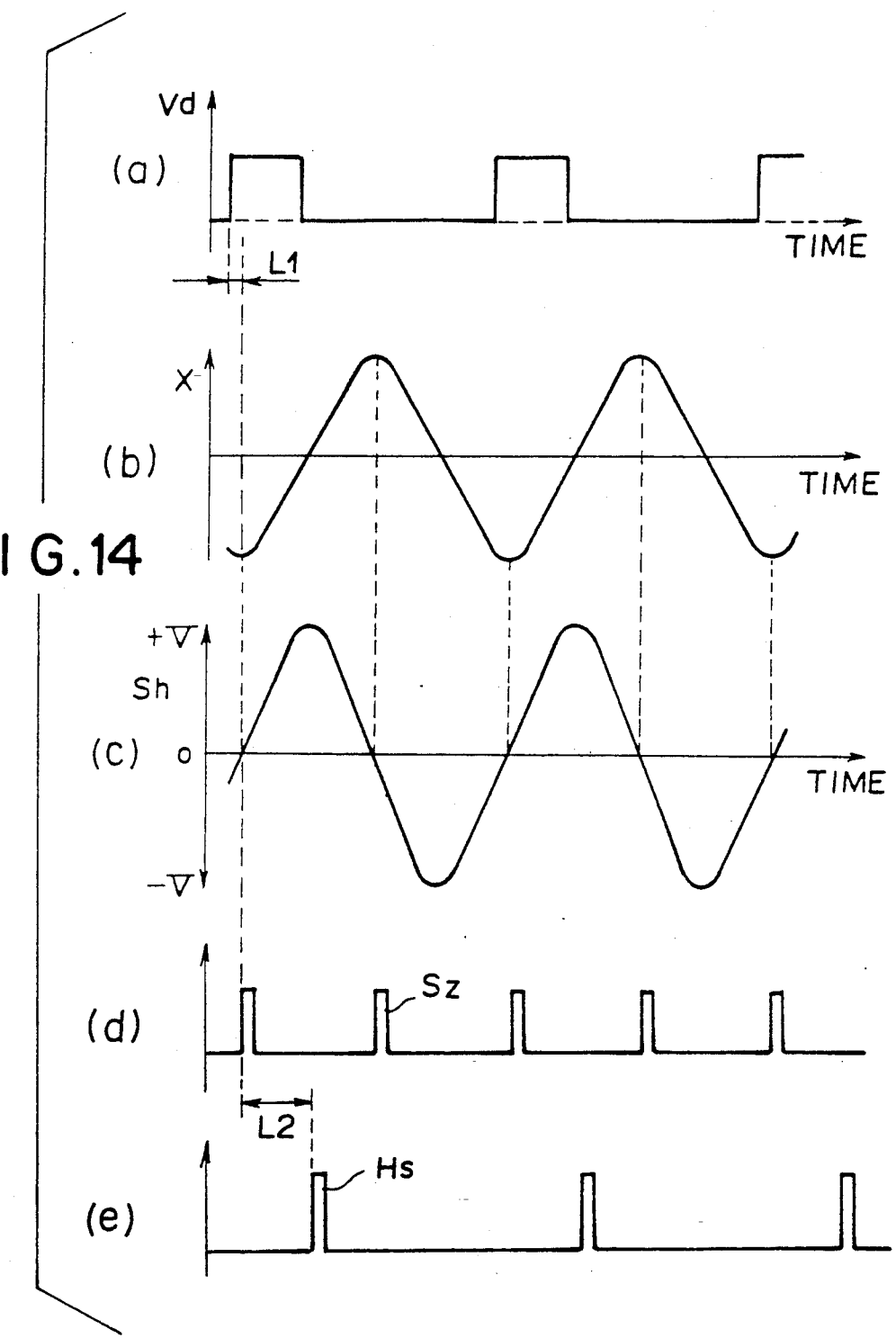
FIG. 14 is a graph showing a relationship between waveforms of various types of signals and a phase of the tuning fork employed in the scanning type microscope according to this invention.

The relationship between the differentiation signal Sh and the phase x of the tuning fork 30 is the same as was illustrated in FIG. 14. Accordingly, sampling at every main scanning is inevitably initiated at a time when the phase of the tuning fork 30 is maximum or minimum (i.e. at a time when the light beam light spot P, which scans across the sample 23, makes a return) or at a time with a constant period of a lag with respect to the former timing. With such a configuration, as has been described in the above, any variations in the relationship between the phase of the rectangular pulse voltage Vd and the phase of the tuning fork 30 will never lead to displacement of a microscope image reproduced by the image reproducing unit 43 in a direction of main scanning.

The operation of the oscillator 145 and the D/A converter 147 are controlled by the vertical sync signal Vs issued from the image processing unit 42 and the focus direction signal Fs, and then the motion of the stages 24Y and 24Z are matched with each other. These vertical sync signal Vs and the focus direction signal Fs are further matched with the aforementioned horizontal sync signal Hs. Thereby, the motion of the stages 24Y and 24Z and the reciprocal traversing of the probe 15 are matched with each other.

Figure 15:
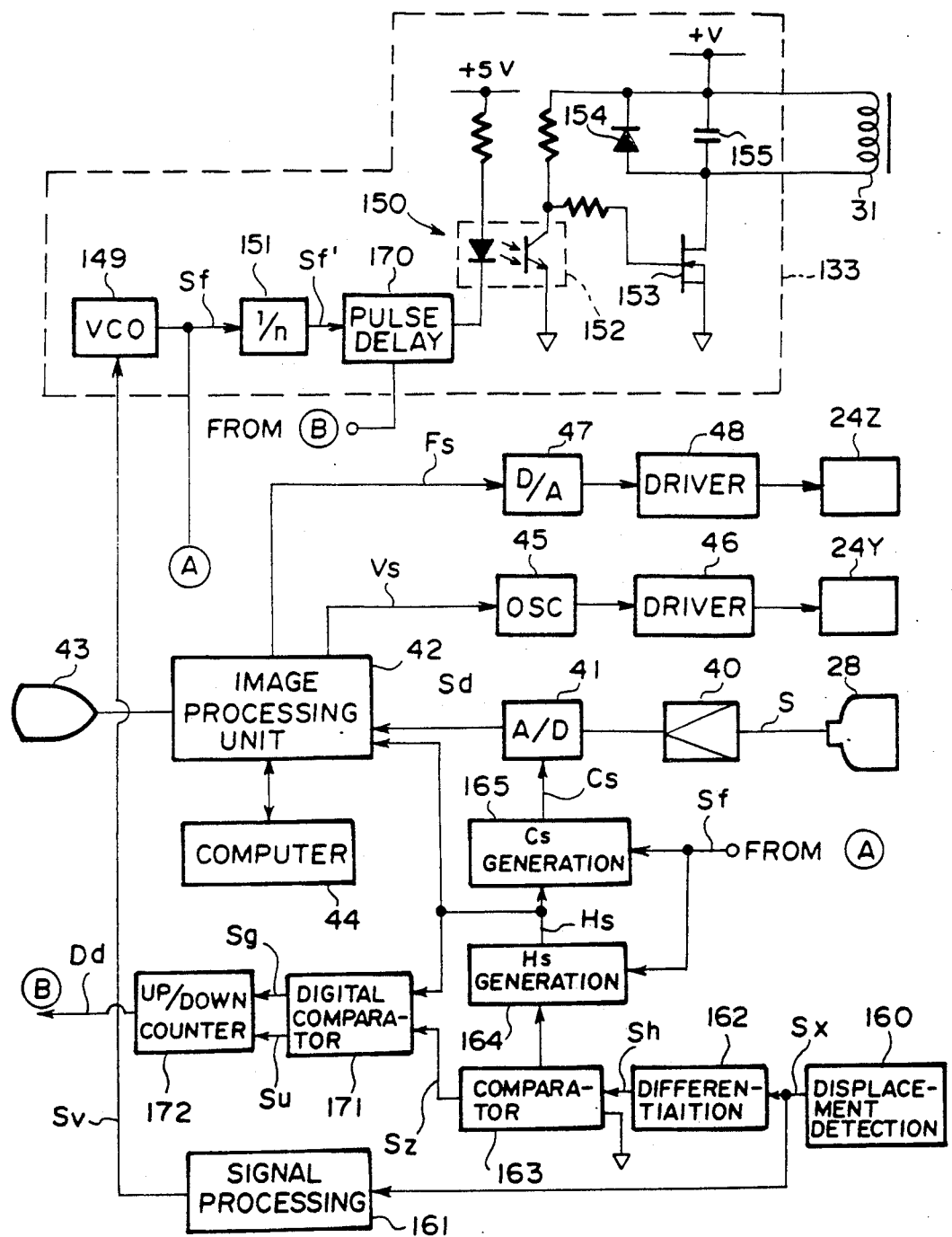
FIG. 15 is a circuit diagram showing a scanning type microscope according to a seventh embodiment of this invention.

With reference to FIG. 15, a seventh embodiment of this invention will now be described. FIG. 15 shows a circuit diagram of the apparatus according to the seventh embodiment of this invention. This circuit may be replaced with the electric circuitry employed in the sixth embodiment as illustrated in FIG. 12.

In this embodiment, a frequency signal Sf' having a frequency 1/n times the frequency signal Sf is delivered to a photocoupler 152 by way of a pulse delay circuit 170. The output timing of the horizontal sync signal Hs, produced from the horizontal sync signal generator circuit 164 (i.e. an output initiation timing of the pixel clock Cp), is defined completely independently of a displacement of the optical means 18 (refer to FIG. 2) along the direction X which is detected by the displacement detector 160. The comparator 163 detects a zero-level of the differentiation signal Sh, and issues the zero-level detection signal Sz upon detection of the zero-level. This zero-level detection signal Sz is further delivered to a digital comparator 171. This digital comparator 171 also receives the horizontal sync signal.

In the case where there is a difference in phase between the input horizontal sync signal Hs and the zero-level detection signal Sz, a gate signal Sg is fed to an up-down counter 172. At this time, an up-down instruction signal Su, in response to the direction of the displacement, is fed from the digital comparator 171 to the up-down counter 172. Upon receipt of the gate signal Sg, the up-down counter 172 increments or decrements counting of a court value, which has been specified, by the given amount designated by the up-down instruction signal Su. This count value is fed to the pulse delay circuit 170 as a delay data Dt. Then the pulse delay circuit 170 delays the frequency signal Sf' for a period in proportion to the count value Dd. Thus, the phase of the driving voltage Vd is retarded as illustrated in FIG. 14.

Upon completion of the aforementioned processing, or repetition of incremental counting or decremental counting of the foregoing count value for several times, the phase x of the tuning fork is retarded, and hence the phase discrepancy L2 between the zero-level detection signal Sz and the timing signal Hs, as illustrated in FIG. 14, is eliminated. As a result of this, sampling of image data every one main scanning line is initiated from a timing where the differentiation signal Sh has a zero-level or a timing with a predetermined period of lag relative to the former timing. Even in this case, therefore, sampling of the analog signal S, at every main scanning will be initiated at a time when the phase of the tuning fork 30 becomes maximum or a minimum (i.e. a time when the light beam light spot P scanning across the sample 23 makes a turn) or at a time with a predetermined period of lag with respect to the former timing.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to those who are versed in the art.

What is claimed is:

1. An optical scanning type image pickup apparatus wherein main and sub scannings of a light beam are carried out across a scanning surface by reciprocally traversing an optical means for irradiating a light beam across the scanning surface relative to the scanning surface, and a light beam having been reflected from the region of the surface on exposure to the light beam is detected by a photodetector to produce an image of a sample, said optical scanning type image pickup apparatus comprising:
   (a) a tuning fork at one end thereof supporting said optical means by means of a scanning mechanism for traversing said optical means,
   (b) a means for detecting the amplitude of said tuning fork, said means including an excitation means for resonating said tuning fork by applying a force, the strength of which periodically changes, to said tuning fork, and
   (c) a control circuit for converging the amplitude of the tuning fork at a desired value by feeding a control signal responsive to an amplitude detection signal generated from said means upon receipt of said amplitude detection signal.

2. An optical scanning type image pickup apparatus, as defined in claim 1, wherein said tuning fork is constituted of a magnetic material, and said excitation means is composed of an electromagnet for applying a magnetic field, the strength of which changes periodically, to said tuning fork, and a driving circuit for operating said electromagnet.

3. An optical scanning type image pickup apparatus as defined either in claim 1 or claim 2, wherein said means for detecting the amplitude of the tuning fork is constituted of a hole element which is positioned adjacently to said tuning fork.

4. An optical scanning type image pickup apparatus as defined either in claim 1 or 2, wherein said means for detecting the amplitude of the tuning fork is constituted of a piezoelectric element which is attached to a curving surface at a base portion of said tuning fork.

5. An optical scanning type image pickup apparatus as defined either in claim 1 or 2, wherein said means for detecting the amplitude of said tuning fork is a piezoelectric device attached to a U-shape surface, being normal to a curving lateral surface, where a maximum stress appears.

6. An optical scanning type image pickup apparatus as defined either in claim 1 or 2, wherein said means for detecting the amplitude of said tuning fork is constituted of a light source for irradiating a light towards said tuning fork and a photodetector for detecting a light reflected from said tuning fork.

7. An optical scanning type image pickup apparatus as defined either in claim 1 or 2, wherein said means for detecting the amplitude of said tuning fork is constituted of a means for detecting a counter-electromotive force generated by said electromagnet.

8. An optical scanning type image pickup apparatus wherein main and sub scanning of a light beam are carried out across a scanning surface by reciprocally traversing relative to each other the scanning surface and an optical means for irradiating a beam of light across the scanning surface, and a light reflected from the region of the scanning surface upon exposure to the light beam is detected by a photodetector, said optical scanning type image pickup apparatus including a signal processing means for producing a digital image data at every main scanning line by sampling a series of outputs from the photodetector, and the improvement further comprising:
- a displacement detector for detecting the displacement of either said scanning surface to be reciprocally traversed or said optical means,
- a differentiating circuit for differentiating a displacement signal generated by said displacement detector, and
- a timing signal generator means for feeding a timing signal to said signal processing means upon detection of a zero-level of the output from said differentiating circuit, whereby said signal processing means initiates sampling at every main scanning line upon receipt of the timing signal.

9. An optical scanning type image pickup apparatus wherein main and sub scannings of a light beam are carried out across a scanning surface by reciprocally traversing relative to each other the scanning surface and an optical means for irradiating a beam of light across the scanning surface, and a light reflected from the region of the scanning surface on exposure to the light beam is detected by a photodetector to capture an image of the sample, said optical scanning type image pickup apparatus, including a signal processing means for producing a digital image data at every main scanning line by sampling a series of outputs from the photodetector, and the improvement further comprising:
- means for feeding a timing signal, which defines a sampling initiation timing at every main scanning line, to said signal processing means,
- a displacement detector for detecting the displacement of either said scanning surface to be reciprocally traversed or said optical means,
- a differentiating circuit for differentiating a displacement signal generated by said displacement detector,
- a zero-level detecting means for detecting a zero-level of an output from said differentiating circuit, and
- a phase error canceler means for canceling a phase error by shifting the driving signal to be input to said reciprocal traversing mechanism by merely an amount equal to a phase difference between the zero-level detection signal generated by said zero-level detecting means and said timing signal.

10. An optical scanning type image pickup apparatus as defined in claim 8 or 9, wherein said displacement detector is constituted of a piezoelectric element.

11. An optical scanning type image pickup apparatus as defined in claim 8 or 9, wherein said displacement detector is constituted of a hole element.

12. A scanning type microscope wherein main and sub scannings are carried out across a sample by traversing an optical means for irradiating a light beam upon the sample relative to a sample supporting member, upon which the sample is disposed, and a photodetector detects a light reflected from the region of the sample exposure to the laser light to capture the image of the sample, said scanning type microscope including a tuning fork at one end thereof supporting said optical means by means of said traversing mechanism for traversing said optical means and an excitation means for causing said tuning fork to resonate by applying force, the strength of which periodically changes, the improvement further comprising:
- a detector means for detecting the amplitude of said tuning fork, and
- a control circuit which receives an amplitude detection signal issued from said detector means and converges the amplitude of said tuning fork at a desired value by feeding a control signal responsive to said amplitude detection signal to said excitation means.

13. A scanning type microscope as defined in claim 1, wherein said tuning fork is constituted of a magnetic material, and said excitation means is composed of an electromagnet for applying a magnetic field, the strength of which periodically changes, to said tuning fork, and a driving circuit for operating said electromagnet.

14. A scanning type microscope as defined in claim 12 or 13, wherein said detector means for detecting the amplitude of said tuning fork is constituted of a hole element attached adjacently to said tuning fork.

15. A scanning type microscope as defined in claim 12 or 13, wherein said detector means for detecting the amplitude of said tuning fork is constituted of a piezoelectric element attached to a curving surface at a base portion of said tuning fork.

16. An optical scanning type image pickup apparatus as defined either in claim 12 or 13, wherein said means for detecting the amplitude of said tuning fork is a piezoelectric element attached to a U-shape surface, being normal to a curving lateral surface, where a maximum stress appears.

17. An optical scanning type image pickup apparatus as defined either in claim 12 or 13, wherein said means for detecting the amplitude of said tuning fork is constituted of a light source for irradiating a light towards said tuning fork and a photodetector for detecting a light reflected from said tuning fork.

18. An optical scanning type image pickup apparatus as defined either in claim 13, wherein said means for detecting the amplitude of said tuning fork is constituted of means for detecting a counter-electromotive force generated by said electromagnet.

19. An optical scanning type image pickup apparatus wherein main and sub scannings of a light beam are carried out across a sample by reciprocally traversing relative to each other a sample supporting member, upon which the sample is disposed, and an optical means for irradiating a beam of light across the sample, and a light reflected from the region of the sample which is exposed to the light beam is detected by a photodetector to capture the image of the sample, said optical scanning type image pickup apparatus including a signal processing means for producing a digital image data at every main scanning line by sampling a series of outputs from the photodetector, and the improvement further comprising:
- a displacement detector for detecting the displacement of either said scanning surface to be reciprocally traversed or said optical means, a differentiating circuit for differentiating a displacement signal generated by said displacement detector, and a timing signal generator means for feeding a timing signal to said signal processing means upon detection of a zero-level of the output from said differentiating circuit, whereby said signal processing means initiates sampling at every main scanning line upon receipt of the timing signal.

20. An optical scanning type image pickup apparatus wherein main and sub scannings of a light beam are carried out across a sample by reciprocally traversing relative to each other a sample supporting member, upon which the sample is disposed, and an optical means for irradiating a beam of light across the sample, and a light reflected from the region of the sample which is exposed to the light beam is detected by a photodetector to pick up an image of the sample, said optical scanning type image pickup apparatus including a signal processing means for producing a digital image data at every main scanning line by sampling a series of outputs from the photodetector, and the improvement further comprising:

a means for feeding a timing signal, which defines a sampling initiation timing at every main scanning line, to said signal processing means, a displacement detector for detecting the displacement of either said scanning surface to be reciprocally traversed or said optical means, a differentiating circuit for differentiating a displacement signal generated by said displacement detector, a zero-level detecting means for detecting a zero-level of an output from said differentiating circuit, and a phase error canceler means for canceling a phase error by shifting the driving signal to be input to said reciprocal traversing mechanism by merely an amount equal to a phase difference between the zero-level detection signal generated by said zero-level detecting means and said timing signal.

21. An optical scanning type image pickup apparatus as defined either in claim 19 or claim 20, wherein said means for detecting the amplitude of the tuning fork is constituted of a piezoelectric element.

22. An optical scanning type image pickup apparatus as defined either in claim 19 or 20, wherein said means for detecting the amplitude of the tuning fork is constituted of a hole element.

23. An optical scanner wherein main and sub scannings of a light beam are carried out across a scanning surface by reciprocally traversing an optical means for irradiating a light beam across the scanning surface relative to the scanning surface, and a light beam having been reflected from the region of the surface on exposure to the light beam is detected by a photodetector to produce an image of a sample, said optical scanner comprising:

(a) a tuning fork at one end thereof supporting said optical means by means of a scanning mechanism for traversing said optical means, (b) a means for detecting the amplitude of said tuning fork, said means including an excitation means for resonating said tuning fork by applying a force, the strength of which periodically changes, to said tuning fork, and (c) a control circuit for converging the amplitude of the tuning fork at a desired value by feeding a control signal responsive to an amplitude detection signal generated from said means upon receipt of said amplitude detection signal.

* * * * *